3,796,710
1H-2,1,4-BENZOTHIADIAZINES

Alan Charles Barker, Peter Doyle, and Richard Gregory Foster, Macclesfield, and John Roger Hadfield, Camberley, England, assignors to Imperial Chemical Industries Limited, London, England
No Drawing. Filed Mar. 27, 1972, Ser. No. 238,582
Claims priority, application Great Britain, Apr. 13, 1971, 9,224/71
Int. Cl. C07d 93/30
U.S. Cl. 260—243 R      4 Claims

ABSTRACT OF THE DISCLOSURE 1H-2,1,4-benzothiadiazines bearing a 3-carbamate radical and a 6- or 7-benzoyl or phenylsulphonyl radical, which are useful as anthelmintics or intermediates; processes for their manufacture and also phenylthioureas useful as intermediates for making the benzothiadiazines.

---

This invention relates to benzothiadiazine derivatives and processes for their manufacture.

According to the invention there is provided a 1H-2,1,4-benzothiadiazine derivative of the formula:

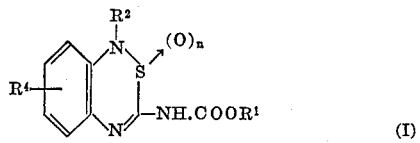

wherein $R^1$ is an alkyl radical of 1–3 carbon atoms, $R^2$ is hydrogen or a radical of the formula $R^3.CO$—, wherein $R^3$ is an alkyl radical of 1–3 carbon atoms, or a phenyl radical optionally bearing a methyl or halogen substituent, $R^4$, which is in the 6- or 7-position of the benzothiadiazine nucleus, is a benzoyl or phenylsulphonyl radical optionally bearing a methyl or halogen substituent, and $n$ is zero or 1.

A particularly suitable value for $R^1$ is a methyl or ethyl radical, and a particularly suitable value for $R^3$ is a methyl or phenyl radical.

Preferred values for $R^4$ are a benzoyl radical and a phenylsulphonyl radical.

Preferred benzothiadiazine derivatives of the invention are those wherein $R^1$ is a methyl radical, $R^2$ is hydrogen or an acetyl or benzoyl radical, $R^4$ is a benzoyl or phenylsulphonyl radical and $n$ is zero, particularly methyl 7-benzoyl-1H-2,1,4-benzothiadiazin-3-ylcarbamate and methyl 6-benzoyl-1H-2,1,4-benzothiadiazin-3-ylcarbamate.

According to a further feature of the invention, there is provided a process for the manufacture of a 1H-2,1,4-benzothiadiazine derivative of the invention which comprises:

(a) for a compound wherein n is zero, reacting an aminophenylthiourea derivative of the formula:

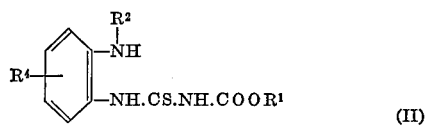

wherein $R^1$, $R^2$ and $R^4$ have the meanings stated above, with an oxidizing agent, for example, a halogen, an N-halo-compound, a peroxide, a halogen oxyacid, or chromic acid, of which an N-halosuccinimide, for example N-chlorosuccinimide, is the preferred oxidizing agent;

(b) for a compound wherein $n$ is zero and $R^2$ is hydrogen, reducing a nitrophenylthiourea derivative of the formula:

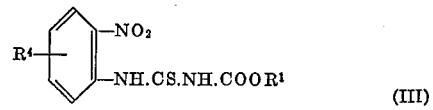

wherein $R^1$ and $R^4$ have the meanings stated above, with an alkali metal dithionite in alkaline solution, for example sodium dithionite in sodium hydroxide solution;

(c) for a compound wherein $R^2$ is a radical of the formula $R^3.CO$—, reacting the corresponding benzothiadiazine of Formula I, wherein $R^2$ is hydrogen, with an acid halide, especially an acid chloride, or anhydride derived from an acid of the formula $R^3.CO.OH$, preferably in the presence of a base, for example pyridine;

(d) reacting a compound of the formula:

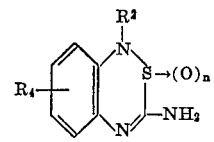

wherein $R^2$, $R^4$ and $n$ have the meanings stated above, with an acid halide of the formula $R^1O.CO.X$, wherein $R^1$ is as above and X is a halogen atom, especially a chlorine atom;

(e) for a compound wherein $n$ is 1, oxidizing the corresponding benzothiadiazine of Formula I wherein $n$ is zero with a per-acid, for example m-chloroperbenzoic acid.

The benzothiadiazine derivatives of the invention possess anthelmintic activity. This activity is demonstrated by their effect in producing a substantial reduction in the worm burden of mice infected with Nippostrongylus and Heterakis species when administered orally to the mice at a dose of 50-25 mg./kg. In the case of compounds wherein $R^4$ is a benzoyl radical, the activity is also demonstrated by their effect in reducing the worm burden of sheep infected with a range of helminths including *Haemonchus contortus, Ostertagia circumcincta, Trichostrongylus axei, Trichostrongylus colubriformis, Nematodirus fillicolis* and also *Dictyocaulus filaria*, when administered orally to the sheep at a dose of 15 mg./kg. At this dose, no undesirable toxic effects were noted.

The benzothiadiazine derivatives of the invention may be used as anthelmintics in the form of a conventional anthelmintic composition comprising an orally or parentarelly acceptable diluent or carrier together with a 1H-2,1,4-benzothiadiazine derivative of the invention, and such a composition is provided as a further feature of the invention.

Such a composition may be in any form conventionally used for veterinary purposes, for example an oral drench, injectable formulation, bolus or salt lick, and may be obtained in the conventional manner using conventional excipients which are too well-known to require detailed elaboration.

When the benzothiadiazine derivatives of the invention are used to combat helminth infestations in domestic animals, for example sheep, cattle or goats, they are preferably administered orally in the form of a drench such that each animal receives a dose of from 10 to 20 mg./kg. Dosing is usually repeated every three weeks during the lambing season.

In addition to possessing anthelmintic activity, the benzothiadiazine derivatives of the invention are also valuable intermediates in a novel process for the manufacture of benzimidazole derivatives which are known to be useful anthelmintic agents. Thus the action of acid on the benzothiadiazine derivatives of the invention converts them, by loss of a sulphur atom and an acyl group, when present, into a 5(6)-substituted-benzimidaz-2-yl-carbamate. In this way, when $R^1$ is a methyl radical and $R^4$ is a benzyl derivative, the anthelmintic agent, mebendazole, is obtained.

The compounds of the Formulae II and III used as starting materials in processes for the manufacture of the benzothiadiazine derivatives of the invention are novel and, as well as being useful intermediates in the manufacture of the benzothiadiazines and benzimidazoles, possess anthelmintic activity. The aminophenylthiourea derivatives have a similar potency to the benzothiadiazines and can be used in the same way. This nitrophenylthiourea derivatives are rather less potent.

According to a further feature of the invention there is provided a phenylthiourea derivative of the formula:

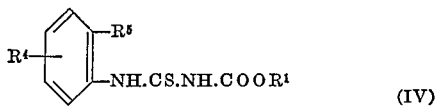

(IV)

wherein $R^4$ is in the p-position relative to one of the other substituents and $R^1$ and $R^4$ have the meanings stated above, and $R^5$ is a nitro radical or a radical of the formula —$NHR^2$, wherein $R^2$ has the meaning stated above.

Preferred values for $R^1$, $R^2$, $R^3$ and $R^4$ are those set out above in respect of the benzothiadiazine derivatives of the invention.

The phenylthiourea derivatives may be obtained by any process known for the preparation of analogous chemical compounds. Thus the following processes for the manufacture of a phenylthiourea derivative of the invention in which $R^1$, $R^4$ and $R^5$ have the meanings stated above are provided as further features of the invention:

(a) reacting an aniline derivative of the formula:

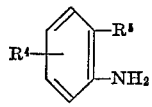

with an alkylisothiocyanatoformate of the formula

$R^1O \cdot CO \cdot NCS$ (b) for a compound wherein $R^5$ is an amino radical, reducing the corresponding phenylthiourea derivative of corresponding phenylthiourea derivative of Formula IV, wherein $R^5$ is a nitro radical, with an alkali metal hydrosulphide, for example sodium hydrosulphide, or with stannous chloride and hydrochloric acid, preferably in the presence of a solvent, especially dioxan when stannous chloride is used;

(c) for a compound wherein $R^5$ is a radical of the formula —$NHR^2$ and $R^2$ is a radical of the formula $R^3 \cdot CO$—, reacting the corresponding phenylthiourea derivative of Formula IV, wherein $R^5$ is an amino radical, with an acid halide, especially an acid chloride, or anhydride derived from an acid of the formula $R^3 \cdot CO \cdot OH$.

The invention is illustrated but not limited by the following examples:

EXAMPLE 1

4-benzoyl-2-nitroaniline (2.5 g.) was dissolved in methyl isothiocyanatoformate (5.0 g.) and the mixture heated at 100° C. for four hours. Methanol (10 ml.) was added to the cooled reaction mixture to give methyl 2-nitro-4-benzoylphenylthionocarbamoylcarbamate as a pale yellow solid, M.P. 183–184.5° C.

EXAMPLE 2

Soduim hydrosulphide (2.24 g.) was added to a solution of methyl 2-nitro-4-benzoylphenylthionocarbamoyl-carbamate (3.69 g.) in dry dimethylformamide (50 ml.). The mixture turned dark green and became warm. It was allowed to cool, and then kept at room temperature for one hour before being added to water (500 ml.). The resulting mixture was extracted with ethyl acetate, and the extract was washed with water, dried and evaporated to give an oily residue which was obtained as a dry powder (1.9 g.) by trituration with methanol. Recrystallization from methanol gave methyl 2-amino-4-benzoylphenylthionocarbamoylcarbamate, M.P. 197–198° C.

EXAMPLE 3

Methylisothiocyanatoformate (0.6 g.) was added to a solution of 2-amino-4-benzoylaniline (0.5 g.) in acetone (15 ml.). The mixture was kept at room temperature for 15 minutes and then evaporated. The residue was crystallized from benzene/petroleum ether to give methyl 2-amino - 5 - benzoylphenylthionocarbamoylcarbamate, M.P. 179–180° C.

The starting 2-amino-4-benzoylaniline was obtained as follows:

A mixture of 4-benzoyl-2-nitroaniline (10 g.), iron powder (100 g.), sodium chloride (10 g.), water (80 ml.) and methanol (750 ml.) was heated under reflux, with stirring, for two hours. The hot mixture was filtered, and the filtrate evaporated. The residue was dissolved in benzene, and the solution was washed with water, dried and evaporated. The residue was recrystallized from benzene to give 2-amino-4-benzoylaniline (5.7 g.), M.P. 107° C.

EXAMPLE 4

The process described in Example 1 was repeated using 2-nitro-4-phenylsulphonylaniline as starting material, and methyl - 2 - nitro - 4 - phenylsulphonylphenylthionocarbamoylcarbamate, M.P. 191–193° C. was obtained.

The starting 2-nitro-4-phenylsulphonylaniline was obtained as follows:

4-phenylsulphonylaniline (5 g.) (W. R. Waldron and E. E. Reid, J. Amer. Chem. Soc., 1923, 45, 2405) was dissolved in pyridine (50 ml.), and ethyl chloroformate (3 g.) was added dropwise to the solution. The mixture was refluxed for 30 minutes, cooled, and then poured into cold water. The precipitate was filtered off, and recrystallized from ethanol to give ethyl 4-phenylsulphonylphenylcarbamate as needles, M.P. 200–204° C.

Potassium nitrate (0.4 g.) was added to a solution of ethyl 4-phenylsulphonylphenylcarbamate (1.6 g.) in concentrated sulphuric acid (10 ml.) keeping the temperature below 35° C. The resultant orange solution was kept at room temperature for 15 minutes and then poured onto ice. The gummy precipitate was extracted with chloroform, and the extract was dried and evaporated. The residue was heated at 100° C. for two hours with concentrated sulphuric acid (10 ml.). The reaction mixture was cooled and poured into ice/water, and the precipitated yellow solid was extracted with chloroform. The extract was dried and evaporated, and the residue was recrystallized from ethanol to give 2-nitro-4-phenylsulphonylaniline (0.6 g.) as yellow prisms, M.P. 172–176° C.

EXAMPLE 5

Methyl 2 - amino-4-benzoylphenylthionocarbamoylcarbamate (200 mg.) was dissolved in acetic anhydride (5 ml.) and the solution heated at 100° C. for one half hour. The mixture was then cooled, the solid filtered off and recrystallized from methanol to give methyl 2-acetylamino-4 - benzoylphenylthionocarbamoylcarbamate, M.P. 201–202° C.

EXAMPLE 6

5-benzoyl-2-nitroaniline (1 g.) and methyl isothiocyanatoformate (1.1 ml.) were dissolved in toluene (10 ml.) and the solution was heated at 95–100° C. for three hours. The solution was then cooled, and the solid product, methyl 2-nitro - 5 - benzoylphenylthionocarbamoylcarbamate, M.P. 201–203° C., was filtered off.

The 5-benzoyl-2-nitroaniline used as starting material is made as follows:

5-benzoyl-2-nitrochlorobenzene (5 g.) and a solution of ammonia in methanol (saturated at 0° C.) (30 ml.) were heated together in a sealed tube at 150° C. for eight hours. The solvent was evaporated, and the residue was triturated with water. The undissolved solid was crystallized from methanol to give 5-benzoyl-2-nitroaniline, M.P. 135–137° C.

EXAMPLE 7

A solution of methyl 2-amino-4-benzoylphenylthionocarbamoylcarbamate (164 g.) in purified methylene dichloride (150 ml.) was cooled to −20° C., and stirred while a solution of N-chlorosuccinimide (67 mg.) in methylene dichloride (20 ml.) was added. The mixture was stirred at −20° C. for 15 minutes, and then washed successively with saturated sodium bicarbonate solution and water. The methylene dichloride solution was dried over sodium sulphate and evaporated. The residue was dissolved in the minimum volume of acetone, and this solution was added to an excess of petroleum ether. The product was filtered off (90 mg.) and recrystallized from methanol to give methyl 7-benzoyl - 1H - 2,1,4-benzothiadiazin-3-ylcarbamate as prisms, M.P. 176–177° C.

EXAMPLE 8

A solution of sodium dithionite hydrate (0.68 g.) in water (7.0 ml.) was added dropwise to a solution of methyl 2-nitro-4-benzoylphenylthionocarbamoylcarbamate (480 mg.) in a mixture of 1 N sodium hydroxide solution (6.7 ml.) and water (7.0 ml.) in a nitrogen atmosphere. 2 N hydrochloric acid was then added until the solution was neutral, and the precipitated solid was collected and recrystallized from methanol to give methyl 7-benzoyl-1H-2,1,4-benzothiadiazin-3-ylcarbamate as pale yellow crystals, M.P. 176–177° C.

EXAMPLE 9

The process described in Example 7 was repeated using methyl 2 - amino-5-benzoylphenylthionocarbamoylcarbamate as starting material, and methyl 6-benzoyl-1H-2,1,4-benzo-thiadiazin-3-ylcarbamate, M.P. 165–167° C. was obtained as pale brown plates.

EXAMPLE 10

The process described in Example 8 was repeated using methyl 2 - nitro-4-phenylsulphonylphenylthionocarbamoylcarbamate as starting material, and methyl 7-phenylsulphonyl-1H-2,1,4-benzothiadiazin - 3 - ylcarbamate was obtained. This material decomposed above 100° C. and showed a single spot $R_F$ 0.65 (revealed with 2% ferric chloride in ethanol) on thin layer chromatography on silica using ethyl acetate as the developing solvent.

EXAMPLE 11

The process described in Example 7 was repeated using methyl 2 - acetylamino-4-benzoylphenylthionocarbamoylcarbamate as the starting material to give methyl 1-acetyl-7-benzoyl - 1H - 2,1,4 - benzothiadiazin-3-ylcarbamate, M.P. 176–177° C. (dec.).

EXAMPLE 12

Acetyl chloride (0.5 ml.) was added to a stirred solution of methyl 7-benzoyl-1H-2,1,4-benzothiadiazin-3-ylcarbamate (500 mg.) in pyridine (10 ml.) at 0° C., and the mixture kept at 0° C. for one and a half hours. A further 0.5 ml. of acetyl chloride was then added, and after being kept at 0° C. for a further half hour the mixture was diluted with water and extracted with ethyl acetate. The extract was washed with saturated sodium chloride solution, dried and evaporated, and the residue was crystallized from benzene/petroleum ether to give methyl 1-acetyl - 7 - benzoyl-1H-2,1,4-benzothiadiazin-3-ylcarbamate (450 mg.), M.P. 176–177° C. (dec.)

In the same way but using benzoyl chloride in place of acetyl chloride, there is obtained methyl 1,7-dibenzoyl-1H - 2,1,4 - benzothiadiazin - 3 - ylcarbamate, M.P. 185–187° C.

EXAMPLE 13

A solution of m-chloroperbenzoic acid (120 mg.) in dioxan (5 ml.) was added to a stirred solution of methyl 7-benzoyl-1H-2,1,4-benzothiadiazin - 3 - ylcarbamate (200 mg.) in dioxan (20 ml.). The mixture was stirred for 10 minutes, then diluted with water (40 ml.), neutralized with sodium bicarbonate solution, and extracted with ethyl acetate. The extract was washed with saturated sodium chloride solution, dried and concentrated to 10 ml. The white crystals which had precipitated were filtered off to give 50 mg. of methyl 7-benzoyl-1H-2,1,4-benzothiadiazin-3-ylcarbamate-S-oxide, M.P. 152–153° C. (dec.)

What we claim is:

1. A 1H-2,1,4-benzothiadiazine of the formula:

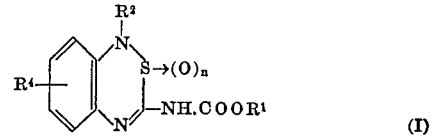

(I)

wherein $R^1$ is alkyl of 1–3 carbon atoms, $R^2$ is hydrogen or a group of the formula $R^3 \cdot CO—$, wherein $R^3$ is alkyl of 1–3 carbon atoms or phenyl, halophenyl or methylphenyl, $R^4$ is in the 6- or 7-position of the benzothiadiazine nucleus and is benzoyl, (halo)benzoyl, (methyl)benzoyl, phenylsulphonyl, (halo)phenylsulphonyl or (methyl)phenylsulphonyl, and $n$ is zero or 1.

2. A compound according to claim 1 wherein $R^1$ is methyl, $R^2$ is hydrogen, acetyl or benzoyl, $R^4$ is benzoyl or phenylsulphonyl and $n$ is zero.

3. Methyl 7-benzoyl-1H-2,1,4-benzothiadiazin - 3 - ylcarbamate.

4. Methyl 6-benzoyl-1H-2,1,4-benzothiadiazin - 3 - ylcarbamate.

References Cited

UNITED STATES PATENTS 3,655,657    4/1972    Adams _____ 260—243

JOHN M. FORD, Primary Examiner

U.S. Cl. X.R.

424—246; 260—552 R